(No Model.) 3 Sheets—Sheet 1.

S. G. SCHOLZ.
BAND CUTTER AND FEEDER.

No. 511,463. Patented Dec. 26, 1893.

WITNESSES
INVENTOR (No Model.) 3 Sheets—Sheet 2.

S. G. SCHOLZ.
BAND CUTTER AND FEEDER.

No. 511,463. Patented Dec. 26, 1893.

WITNESSES   INVENTOR
E. G. Lane   Samuel G. Scholz
Burt K. Miller   By W. K. Miller
   Attorney (No Model.) 3 Sheets—Sheet 3.
S. G. SCHOLZ.
BAND CUTTER AND FEEDER.
No. 511,463. Patented Dec. 26, 1893.
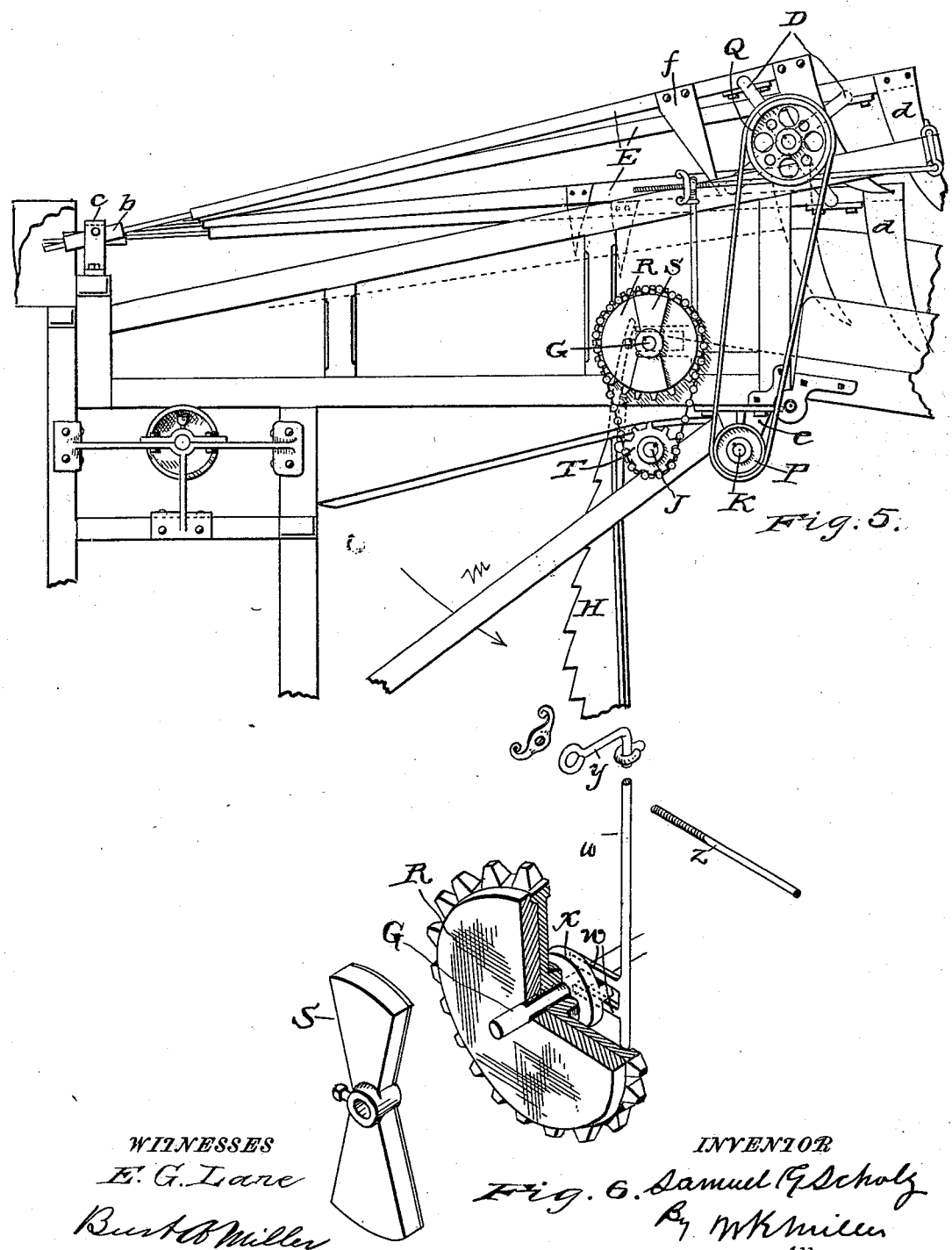

UNITED STATES PATENT OFFICE.

SAMUEL G. SCHOLZ, OF BILLINGS, MISSOURI.

BAND-CUTTER AND FEEDER.

SPECIFICATION forming part of Letters Patent No. 511,463, dated December 26, 1893.

Application filed February 27, 1893. Serial No. 463,841. (No model.)

*To all whom it may concern:*

Be it known that I, SAMUEL G. SCHOLZ, a citizen of the United States, and a resident of Billings, county of Christian, State of Missouri, have invented a new and useful Improvement in Band-Cutters and Feeders, of which the following is a full, clear, and exact description, reference being had to the accompanying drawings, making part of this specification.

My invention relates to improvements in automatic band cutters and feeders, and consists in certain features of construction and combination of parts as will be hereinafter described and pointed out in the claims.

Figure 1:
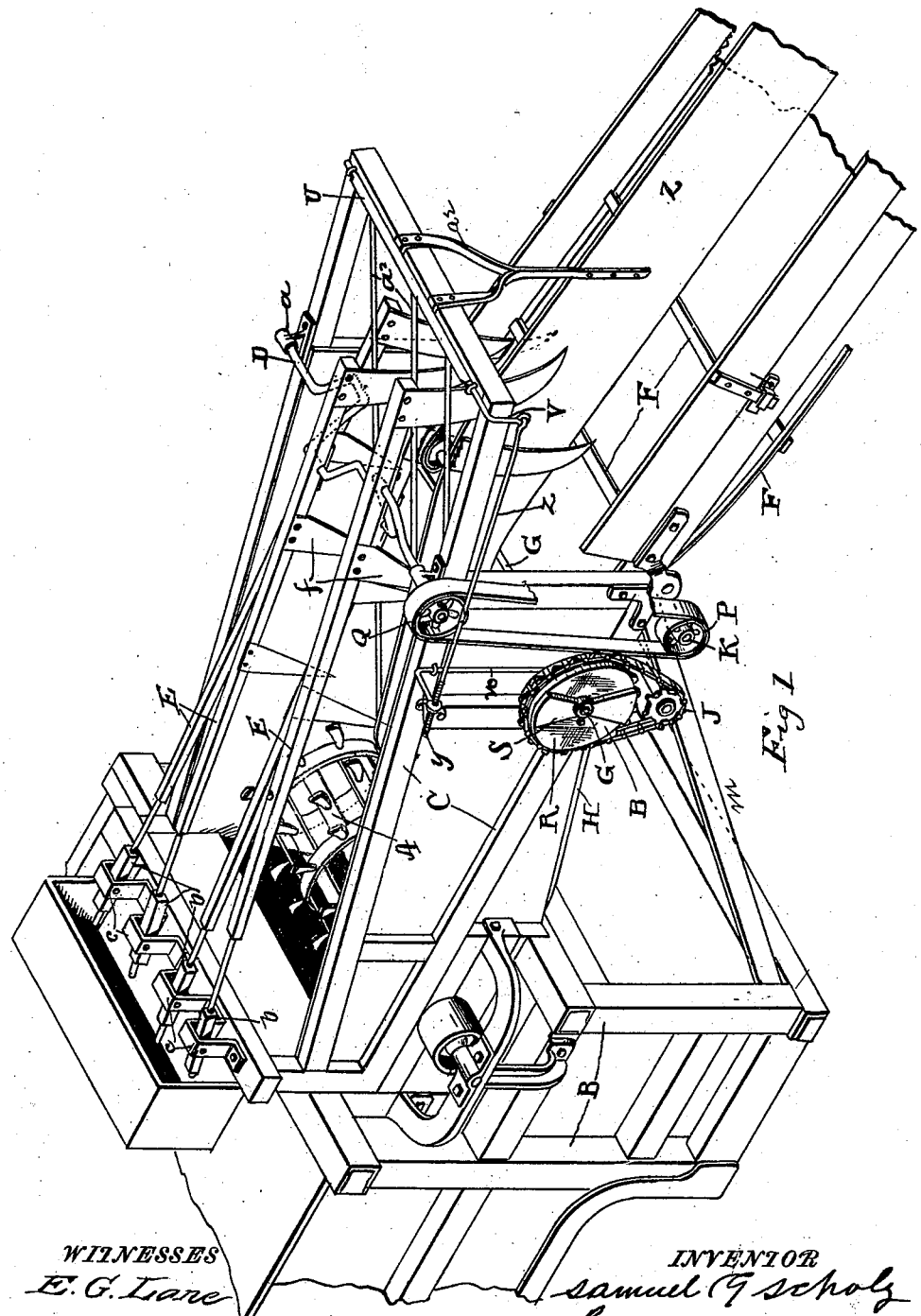
Figure 2:
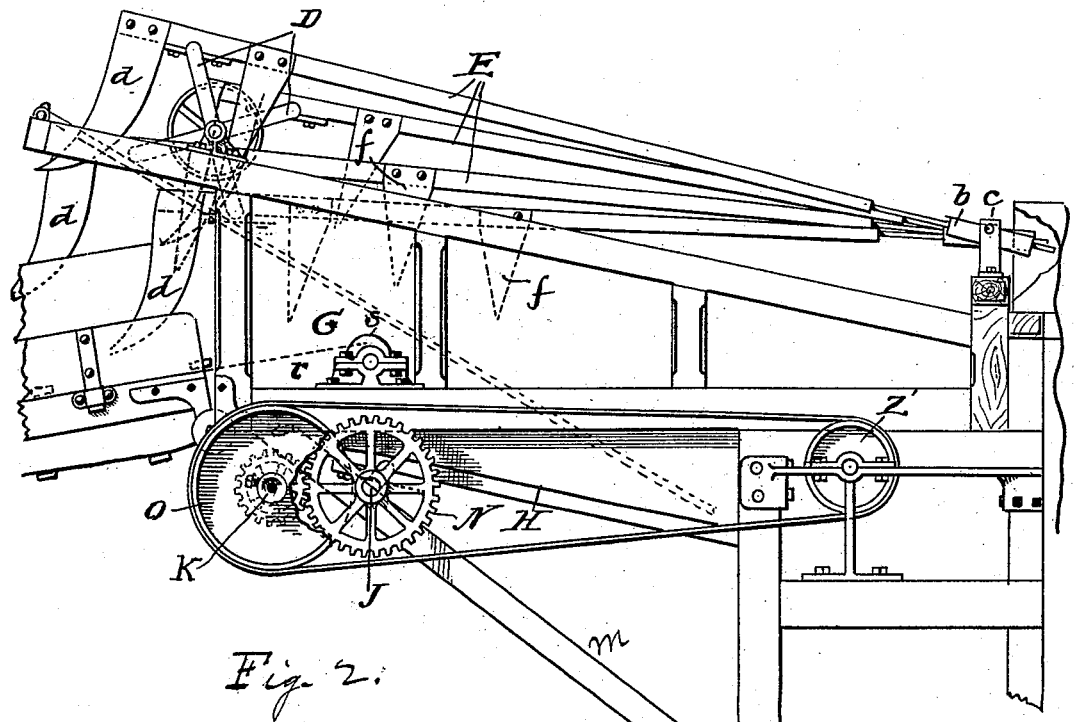
Figures 3, 4:
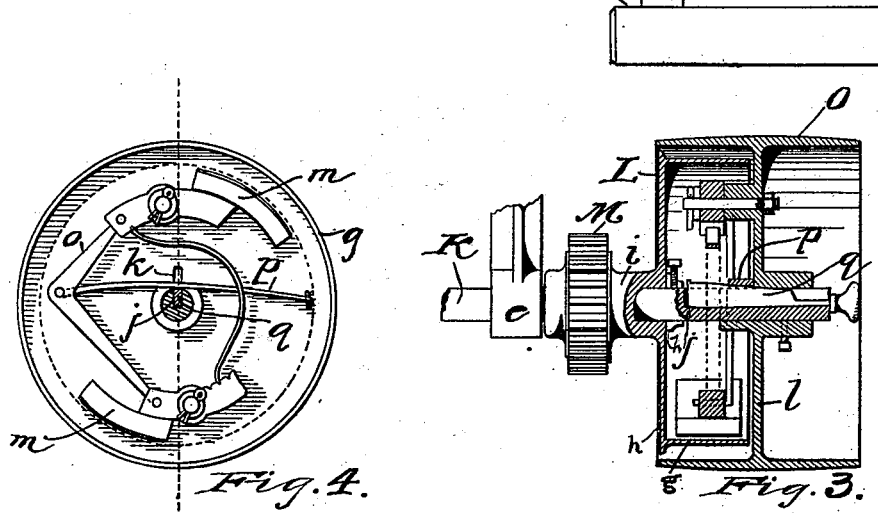

Figure 1, of the accompanying drawings is a view in perspective of a band cutter and feeder illustrating my invention. Fig. 2, is a side elevation of left hand side of the machine; Fig. 3, a view of driving clutch and pinion partly sectional; Fig. 4, a plan view of the clutch showing the detail; Fig. 5, a side elevation of left hand side; and Fig. 6, is a perspective of a clutch and sprocket wheel.

Referring to Fig. 1, A represents the thrashing cylinder; B, the frame of the front end portion of a thrashing machine frame; C, the supporting frame of the band cutter and feeder. The rear end portion of the frame C, is secured to the thrasher frame B, the front end by a brace, extending from the thrasher frame to the front of the frame C. At the front upper portion of frame C, is secured journal boxes $a$ in which is journaled a cranked shaft D, having journaled thereto cutter supporting arms E, the rear ends of which pass through oscillating slides $b$ that are pivotally secured in a support $c$ provided therefor on the rear portion of the frame, C. At the front end of the arm E, are secured band cutters $d$ that project downwardly and forward having a saber like cutting edge as shown; at the rear of the cutters $d$ are provided additional cutters $f$ of the form substantially as shown, which serve as band cutters and feeders as they penetrate the bundles and draw them toward the thrashing cylinder. The cutters $d$ are rotated about the shaft D upward and forward and downward and back and are held in operative position by the arms E. At the front of the frame C, is hinged the frame of the bundle carrier F, which is constructed in the usual way having side belts and cross slats, the belts driven by pulleys $s$ on shaft G, that is journaled to the front portion of the frame C. At the bottom of the throat leading from the carrier F to the thrashing cylinder in place of the usual feed board, is provided a rake H. This rake is reciprocated by the cranked shaft J, in Figs. 2 and 5. The rear end of the rake is shown dropped down to permit access to the cylinder.

To operate the parts hereinbefore described, a driving shaft K is secured to the lower front portion of the supporting frame C, by journal boxes $e$. See Figs. 3 and 5. On the right hand end of the shaft K is loosely mounted a clutch pulley L having an over hung rim $g$, integral with the web $h$. On the hub $i$ of the pulley L is provided a driving pinion M, the teeth of which engage the teeth of wheel N, mounted on the cranked shaft J. The pulley L is held from longitudinal movement on the shaft by the journal box $e$, and a collar $h'$ secured to the shaft by a set screw. In the end portion of the shaft is provided groove $j$, and in the hub of the driving pulley O, is provided a corresponding groove $k$, (see Fig. 4) which will be explained farther on.

To the web $l$ of the pulley O, is pivotally secured clutch shoes $m$ to which is pivotally secured a spring bar $o$. A spring P, is secured by one of its ends to the web $l$, the other end secured to the spring bar as shown, the bar connected to the shoes. The object of the springs is to regulate the pressure of the shoes on the rim of the clutch pulley L, and to increase or decrease the tension of the spring a wedge shaped key as $q$, (see Figs. 3 and 4,) is placed in the groove $j$ in the end of the shaft K as shown in Fig. 3; as this key is drawn out, the grade on the side of the key will press the spring to one side, which movement will incline the bar $o$ in the same direction to release or diminish the grip or pressure of the shoes on the rim $g$ of the pulley L. The driving pulley O is secured to the shaft K and rotates therewith; on the opposite end of said shaft is mounted a pulley P, (see Figs. 1 and 5) having a belt connection with a similar pulley Q on the cranked shaft D.

On the cross shaft G inside the journal boxes $r$ (see Fig. 2) is mounted pulleys $s$ over which the side straps of the carrier F are passed by which the carrier is driven. On the outer end of shaft G is loosely mounted a sprocket wheel R, on the outside of which is secured to the shaft clutch arms S, the wheel B having a chain engagement with a sprocket pinion T on the cranked shaft J.

Referring to Fig. 1, on the front upper portion of the frame is provided a cross shaft U, held in a rocking relation thereto by the staples $u$, the end portion of the shaft bent down to form a cranked portion $v$. At the side of the machine is provided a rocking bar W, having at its lower end portion outwardly projected prongs $w$ that embrace the shaft G, and lugs of the collar $x$ that rest against the hub of the sprocket wheel. The upper end of the bar is turned out as shown, forming a cranked portion $y$. The cranked portions $v$ and $y$, are connected by the rod $z$ having at one end a threaded portion and a thumb nut by which the parts may be adjusted. From the bar U rods $a'$ are projected rearwardly and down over the rake H as shown. The weight of these fingers serve to rock the shaft U to turn the crank $v$ forward. The link $z$ drawing on the crank $y$ of the bar W, will turn the prongs $w$ to press the collar $x$ against the hub of the sprocket wheel R, to move and hold said wheel against the brake arm S, and thereby rotate the shaft G to drive the carrier F. The guide board Z extending over the carrier F and down over the rake H, is secured to the frame C, by the iron $a^2$, as shown and serves to guide the bundles longitudinally over the carrier and rake to the cylinder A.

In operation the driving clutch pulley O, has a belt connection with a pulley Z', on the thrashing cylinder. When the machine is started, the shaft K will be rotated by the pulley O, secured thereto. The pulley P, on the opposite end having a belt connection with the pulley Q on the crank shaft D, will rotate said shaft to operate the cutters. At this instant there is but one part of the machine in operation, that is the band cutter. When the thrashing cylinder has reached a given speed, the clutch shoes $m$ will be thrown out against the ring $g$ of pulley L, to rotate said pulley and the pinion M, whereby wheel N, will be rotated with the cranked shaft J, by which the rake H is operated to feed the grain down from the carrier F, to the cylinder A; sprocket wheel T mounted on shaft J is driven by a geared connection with driving shaft K, and having a chain connection with sprocket R on shaft G, will rotate said shaft when the wheel is held in engagement with the clutch arm S. If the motion of the thrashing cylinder be checked by clogging of the machine or running down of the power, the spring $p$ will draw the shoes $m$ from the ring $g$ of clutch pulley L, thereby stopping the carrier F and the rake H, stopping the supply of grain to the machine until it has cleared itself and the cylinder regained its former speed when the clutch will again act to put the several parts in motion. If at any time the carrier F has carried in more grain than the rake H and cylinder can dispose of the grain so carried in will raise the rods $a'$ to release the wheel R from the clutch S to stop the carrier F, and the incoming grain, the movement of the knives and the rake H continuing to move the grain under the rods $a'$ to the cylinder allowing the rods to drop and throw the parts again in operation. I wish at this point to call attention to the automatic features of my invention, that without the intervention of manual assistance other than to supply the bundles of grain to the carrier F, the grain will be fed to the thrashing cylinder in such quantities as may be commensurate with the speed of the cylinder.

Having thus fully described the nature and object of my invention, what I claim, and desire to secure by Letters Patent, is—

1. The combination with a thrashing cylinder of an automatic band cutter and feeder comprising a driving shaft K having loosely mounted thereon pulley L having an overhung flange $g$, and a pinion M supported thereon, a driving pulley O, mounted on shaft K, having clutch shoes to engage the over hung flange $g$, of the pulley L, the pinion M secured to said pulley to engage a wheel N, to rotate the cranked shaft J, thereby vibrating the rake H, a sprocket wheel mounted on the opposite end of said shaft having a chain engagement with a similar wheel R, loosely mounted on cross shaft G, clutch S secured to the shaft G, to rotate the carrier F, pulley P, mounted on shaft K, having a belt connection with a similar pulley on cranked shaft D, cutters $d$ secured to vibrating bars E, cross bars U, having rearwardly extending rods $a'$, rod $w$, and connecting link $z$, substantially as described and for the purpose set forth.

2. The combination with a thrashing cylinder of the driving shaft K, loose pulley L thereon having secured thereto a pinion M, engaging gear wheel N, by which the cranked shaft J is rotated to vibrate the rake H, sprocket pinion T, having a chain connection with wheel R, and clutch arms S the rods $a'$, secured to the rock-shaft U, the crank V, the link $z$ connected therewith, the bar W adjustably connected with said link, the prongs $w$ and the collar $x$, on shaft G to operate the carrier F, crank shaft D, cutter $d$ and clutch pulley O, whereby the said cylinder on attaining certain speed engages and operates the said parts to cut the bands and feed the cylinder, and on loosening or dropping below the working speed said clutch will disengage to stop the feed substantially as set forth.

3. The combination of the rake H, cranked shaft J having a clutch connection with the carrier actuating shaft G, and the rods $a'$ secured to the rock-shaft U, provided with a crank V, the link z, connected therewith, the bar W, adjustably connected with said link, the prongs w and the collar x, connected with shaft G, substantially as described and for the purpose set forth.

4. The combination in a band cutter and feeder of the carrier F, cranked shaft D, and knives to cut the bands of the rods a', the rock-shaft U having crank V, the link z connected therewith, the bar W adjustably connected with said link, the prongs w, the collar x, the shaft G, sprocket-wheel R, mounted thereon, and the clutch arms secured to said shaft, substantially as described.

5. The combination with the shaft K, of the clutch pulley L, having an overhung flange g, a driving pulley O, having pivotally secured thereto clutch shoes m to engage the flange g, spring bar o, having a pivotal engagement with said shoes, spring p and wedge or key q, substantially as described and for the purpose set forth.

6. The combination with the shaft K, clutch pulley L, having an overhung flange g, a driving pulley O, having pivotally secured thereto, clutch shoes m, to engage the flange g, spring bar o having a pivotal engagement with said shoes, the spring p and wedge or key q, of the pinion M, secured to pulley L, the crank shaft J, the wheel N, the oscillating rake connected with said shaft, the shaft G, the pulleys s, and the carrier F, substantially as described.

In testimony whereof I have hereunto set my hand this 18th day of February, A. D. 1893.

SAMUEL G. SCHOLZ.

Witnesses:
W. K. MILLER,
CHAS. R. MILLER.